United States Patent
Mikulski

(10) Patent No.: US 12,549,783 B2
(45) Date of Patent: Feb. 10, 2026

(54) METHOD AND SYSTEM FOR RECEIVING A DATA STREAM AND OPTIMIZING THE DETECTION OF A SPECIFIC POSITION WITHIN THE DATA STREAM

(71) Applicant: HURRA COMMUNICATIONS GMBH, Stuttgart (DE)

(72) Inventor: Piotr Mikulski, Cracow (PL)

(73) Assignee: HURRA COMMUNICATIONS GMBH, Stuttgart (DE)

( * ) Notice: Subject to any disclaimer, the term of this patent is extended or adjusted under 35 U.S.C. 154(b) by 97 days.

(21) Appl. No.: 18/227,460

(22) Filed: Jul. 28, 2023

(65) Prior Publication Data

US 2024/0040166 A1 Feb. 1, 2024

(51) Int. Cl.
| | |
|---|---|
| H04N 7/16 | (2011.01) |
| H04H 60/32 | (2008.01) |
| H04N 21/234 | (2011.01) |
| H04N 21/439 | (2011.01) |
| H04N 21/643 | (2011.01) |
| H04N 21/81 | (2011.01) |
| H04N 21/8547 | (2011.01) |

(52) U.S. Cl.
CPC ... *H04N 21/23418* (2013.01); *H04N 21/4394* (2013.01); *H04N 21/64322* (2013.01); *H04N 21/812* (2013.01); *H04N 21/8547* (2013.01)

(58) Field of Classification Search
CPC ......... H04N 21/23418; H04N 21/4394; H04N 21/812; H04N 21/8547; H04N 21/4307; H04N 21/44008; H04N 21/8153; H04N 21/2668
See application file for complete search history.

(56) References Cited

U.S. PATENT DOCUMENTS

| | | |
|---|---|---|
| 7,853,664 B1 | 12/2010 | Wang et al. |
| 10,346,474 B1 | 7/2019 | Kalampoukas et al. |
| 2012/0064975 A1* | 3/2012 | Gault ............ H04L 67/131 463/42 |
| 2015/0149273 A1 | 5/2015 | Schweier |

(Continued)

FOREIGN PATENT DOCUMENTS

| | | |
|---|---|---|
| EP | 2827604 B1 | 1/2018 |
| EP | 4 109 913 A1 | 12/2022 |

*Primary Examiner* — Gigi L Dubasky
(74) *Attorney, Agent, or Firm* — William J. Barber; WARE FRESSOLA MAGUIRE & BARBER LLP

(57) ABSTRACT

A method features receiving a data stream (DS) having video and audio data; detecting a specific position within the DS classified by a predefined criterion (PC) and received by user's clients matching the PC; connecting the receiver not matching the PC with a client-server system matching the PC; receiving the DS by the client-server system and forwarding it to the receiver; extracting the video data and the audio data from the DS stream; creating a screenshot out of the video data and an associated timestamp; feeding the screenshot to an AI-system trained to detect whether it belongs to a predefined category; generating audio data corresponding with the screenshot and analyzing it for detecting whether it belongs to the predefined category; and if both the screenshot and the audio data generated/analyzed belong to the predefined category, then deciding that the associated timestamp for the screenshot defines the specific position.

20 Claims, 4 Drawing Sheets

(56) References Cited

U.S. PATENT DOCUMENTS

| | | | |
|---|---|---|---|
| 2016/0088326 A1* | 3/2016 | Solomon | H04N 21/254 725/12 |
| 2017/0264970 A1 | 9/2017 | Mitra et al. | |
| 2020/0145256 A1* | 5/2020 | Medamana | H04L 67/306 |
| 2023/0156058 A1* | 5/2023 | Adyanthaya | H04H 60/46 709/219 |

* cited by examiner

METHOD AND SYSTEM FOR RECEIVING A DATA STREAM AND OPTIMIZING THE DETECTION OF A SPECIFIC POSITION WITHIN THE DATA STREAM

BACKGROUND OF THE INVENTION

The invention relates to a method and a system, in particular a server system, for receiving a data stream by a receiver and detecting a specific position within a data stream, wherein the data stream comprises at least one video data stream and at least one audio data stream, the data stream is classified according to at least one predefined criterion and intended to be received by user's clients that match the at least one predefined criterion.

Data streams of the above mentioned kind can be transmitted from a server to a user's client. The server can be realized as a combination of hardware and software or solely as software that is executed on a multi-purpose hardware, e.g. a computer system, a laptop, or an embedded system. The software is programmed such that the data stream can be broadcasted or send upon request to the user's client via a communication system. A communication system can comprise aerial transmission, satellite transmission and/or transmission via a communication network such as the internet. The user's client can be realized as a combination of hardware and software or solely as software that is executed on a multi-purpose hardware, e.g. a computer system, a laptop, a Smart TV, a Smartphone or an embedded system. The client is programmed such that the data stream can be received via a communication system.

Data streams may represent various different types of content, like movies, video tutorials, TV programs, commercials, live streams, and so on. Usually, a data stream is a sequence of different types of content, e.g. a TV program with commercial breaks.

Throughout the context of this invention, a specific position defines any position within a data stream that may be of special interest. For example, it might be of special interest to know the positions at which one type of content ends or another type of content starts. Specific positions may also define the start of a predefined commercial or the position at which a certain product is placed within a movie.

The knowledge of specific positions within data streams is important in various applications. For example, if the data stream is a video tutorial, a specific position may define the position at which a specific topic is explained. Knowing this position enables to automatically select and display additional information like a short description of this topic, a schematic diagram, or an URL (Uniform Resource Locator), i.e. a so called 'link' to a bookstore where a book with related information can be ordered. In the field of online advertisements, it is known to automatically display a link to an online shop where a certain product can be ordered whenever a commercial that is related to the product is displayed to the viewer of a TV program.

Generally, an additional information that is automatically presented to a user while receiving a data stream upon detection of a specific position within the data stream potentially reduces the workload of the communication system, since there is less need for a user to search for this additional information. Searching for information is not only time consuming but significantly increases the workload of the search engines and the internet.

For example, if a user watches a technical repair tutorial and a special tool is needed to perform a task that is currently explained via the repair tutorial, the additional information might be an URL or a link to an online shop where the user can order this tool, or the additional information may be a list of ordinary tools that may be used alternatively.

The additional information may be received using the same hardware that is used for receiving the data stream, e.g. by using a Smart TV. However, the user's client may also comprise several hardware devices and/or several software entities that enable to receive the data stream and the additional information via different devices. For example, the user's client comprises a Smart TV for receiving and displaying the data stream and a smartphone for receiving and displaying the additional information.

Various new technologies allow to generate and transmit data streams and corresponding additional information to users or various groups thereof, such that the content is more specific according to one or more criteria. In particular, data streams may be specifically generated and transmitted to users that live in a certain country, a region within a country or a city. Such data streams may comprise information that is of specific interest to the users that belong to a certain classification. The specific information may relate for example to local advertisements, local weather information, local events or regional holiday seasons.

In order to select and present highly relevant additional information, it is important to analyze the data stream that is transmitted to the user's device. The inventor has found that additional information that corresponds to a particular content of a data stream, e.g. a TV program, is best received by users if it is transmitted and/or displayed in approximate synchronization with the beginning of the presentation of the specific content within the data stream. Therefor the knowledge of specific positions that define the beginning of the specific content is important.

From EP 2 827 604 B1 a method is known for optimizing online advertisements that are booked via a communication network in a system for real-time booking of online advertisements in the communication network at a particular time. A server that is connected to the communication network automatically scans a broadcast radio program running on at least one station, the server automatically evaluates the broadcast radio program for the purpose of recognizing particular content, and the server optimizes the online advertisement according to a particular algorithm on the basis of the result of the evaluation of the broadcast radio program.

The known server recognizes the content of the broadcast radio program in particular by creating digital audio fingerprints from the audio contents of the scanned broadcast radio program with audio fingerprints that are previously analyzed with regard to this particular content and stored in a database if the previously analyzed audio fingerprints belong to the specific content, e.g. a commercial break. If the comparison results in a match it is assumed that the content of the current radio program also belongs to the specific content. A method for recognizing the content of a broadcast audio and/or video program based on analyzing the audio data that are part of the broadcast program is described in detail in U.S. Pat. No. 7,853,664—but for a different purpose than in the case of the present invention. Explicit reference is made to this document in relation to the implementation of the step for recognizing the content of the broadcast radio program. For this purpose, the cited document is included in the content of the present application as reference.

From EP 2 827 604 B1 it is further known to scan a broadcast radio program specifically for the purpose of recognizing advertising blocks in order to increase the efficiency of additional information, in particular online advertisements that are transmitted to a user's client (e.g. a smartphone or a laptop) and displayed while the radio program is broadcast. The known method describes a method for optimizing the selection and presentation of online advertisements such that it is of particular interest to users that are currently listening to the radio program.

For selecting additional information and detecting specific positions within a data stream it is therefore of great importance to identify the positions within the data stream with high reliability and accuracy where a particular content is displayed.

However, since the content of these data streams and additional information may vary according to one or more criteria the user's clients match, e.g. because of different regions the user's devices are located in, it is currently not possible to receive and analyze these specific (e.g. regionalized) data streams with a server system that does not match the specific criterion, e.g. because the server system or—more specifically—the receiver is located in another region.

It is an object of the present invention to provide a method for receiving a data stream that is classified according to at least one predefined criterion and intended to be received by devices that match the at least one predefined criterion with a server system that does not match the criterion and using this server system for detecting with increased reliably specific positions within the data stream, wherein the data stream comprises at least one video data stream and at least one audio data stream.

This object is solved by a method for receiving a data stream by a receiver and detecting at least one specific position within the data stream, comprising the following steps:
  connecting the receiver that does not match the at least one predefined criterion with a client-server system that matches the at least one predefined criterion;
  receiving the data stream by the client-server system and forwarding the data stream to the receiver;
  extracting the video data stream and the audio data stream from the data stream;
  creating at least one screenshot out of the video data stream and an associated timestamp;
  feeding the screenshot to an AI-system that is trained to detect whether the screenshot belongs to a predefined category;
  determining audio data corresponding with the screenshot and automatically analyzing the audio data for detecting whether it belongs to the predefined category;
  if both the screenshot and the corresponding audio data belong to the predefined category, deciding that the timestamp that is associated with the current screenshot defines a specific position.

The proposed method works preferably—but is not limited to—data streams that are transmitted via cable, satellite and/or the internet.

The proposed method enables the receiver of the server system to receive a data stream that is intended to be only received by user's clients that belong to a certain category by matching a predefined criterion, e.g. user's clients that are located within a certain region, although the receiver itself does not match the specific criterion, e.g. because the receiver is located in another region. This is achieved by using a client-server system that matches the criterion, e.g. because it is located in a certain region. The client-server system receives the data stream from the TV-Station or a specific server that belongs to a broadcasting organization that broadcasts digital TV programs via cable, satellite and/or the internet and forwards this data stream to the receiver of the server system.

The server system is thus enabled to receive a data stream although it does not belong to the particular category the data stream is intended to be broadcasted to. This is in particular advantageous if the server system uses the data for analyzing the content and generating and/or selecting additional information that is to be presented to the user's client or another user's device, e.g. a user's smartphone or tablet. In particular, it is suggested that the server system according to the present invention comprises means and/or is programmed to execute the method according to the present invention.

The method comprises a step of creating screenshots, e.g. image files, out of the video data streams and a step of creating audio data out of the audio stream, wherein at least some of the screenshots correspond with some of the audio data. Advantageously, screenshots and audio data correspond if they share the same timestamp with respect to the data stream. If for example the data stream is a TV program, corresponding screenshots and audio data are snapshots of the video information and the audio information that are intended to be synchronously presented to the user, e.g. via a Smart TV, a laptop or a smartphone.

The present invention not only enables the server system to receive and analyze data streams that are originally intended to be only received by devices that are classified by matching a particular criterion the server system does not match, it also enhances the detection capabilities of the method known from EP 2 827 604 B1, which analyzes only the audio data streams, by incorporating an additional analyzing procedure, which analyzes the video data streams. This results in a more reliable detection of specific positions within a data stream comprising a video data stream and an audio data stream. The analysis of the video data stream is preferably effected by means of an AI-system, as will be described in more detail below. The AI-system is preferably taught with data and information retrieved from the analysis of the audio data stream. The results of the video stream analysis are preferably used to update or correct a weighting factor previously calculated as a result of the analysis of the audio data stream. The weighting factor may be used for determining the reliability of the detected specific position within the data stream.

According to a preferred embodiment of the invention, the user's clients are enabled to receive information according to the HbbTV (Hybrid Broadcast Broadband TV) standard. The user's clients might in particular be realized as HbbTV devices, e.g. Smart TVs and/or Set Top Boxes. Services delivered through HbbTV include enhanced teletext, catch-up services, video-on-demand, EPG (Electronic Programme Guide), interactive advertising, personalization, voting, games, social networking, and other multimedia applications. These services benefit particularly from transmitting the respective content to categorized user's clients since these services allow to transmit various kinds of information to a user which may enhance the overall relevancy to the user if it is specifically adapted according to e.g. the region or town where the user lives.

Preferably, the classifications of the data stream are related to a country, a federal state, a province and/or a region the user's client is located at. Using these categories can drastically enhance the relevance of both the content of the data stream and the additional information. For example, the data stream may contain advertisements that belong to regional shops or to regional events. The additional information may consist of information related to the local weather, opening hours of local restaurants, terms of delivery of a local shop, availability of a certain product in a shop close to the user, etc.

With the rise of streaming services, in particular streaming TV and streaming online video, an increasing number of user's clients receive data streams via the internet. According to the Internet Protocol, each device that communicates via the internet has an IP (Internet Protocol) address assigned to it. This IP address is transmitted from the user's client to the server broadcasting the data stream, e.g. a TV program. Since the broadcasting server knows the IP address, it can be used to define one or more criteria and thus classifications a user's client belongs to. If the classification is related to the location of the user's client, exiting services denoted as 'Internet Geolocation' can be used in order to identify the location from a given IP address. One basic source for IP address data is the regional Internet registries which allocate and distribute IP addresses amongst organizations located in their respective service regions. There are also several geolocation databases, that provide the information. Some commercial databases even have augmented geolocation software with demographic data to enable demographic-type targeting using IP address data.

According to a preferred embodiment of the inventive method, an IP address is assigned to the user's client, the IP address is used to define the category the user's client belongs to. The receiver of the server system is connected to a client-server system that matches a specific criterion e.g. the client-server system is located in a specific region. The receiver is preferably connected with the client-server system via a Virtual Private Network (VPN). Typically, a VPN is a virtual point-to-point connection through the use of dedicated circuits or with tunneling protocols over an existing network, e.g. the internet. Generally, a VPN makes the resources of the server available to the client. Applying the VPN in the context of the present invention by connecting the client-server system with the receiver of the server system, enables the server system to receive the data stream that was originally sent to the client-server system.

If this data stream is enriched with regional or local information according to the specific classification the client-server system belongs to, it can only be received by devices with an IP address that matches the specific criterion. The inventive method however overcomes this problem by installing a VPN between the client-server system and the receiver which allows the server system to act as if it would reside in the same region as the client-server system.

In an advantageous further embodiment of the invention, the receiver of the server system is connected to more than one client-server system which belong to different classifications—e.g. because they belong to different regions—and receives several data streams in parallel that belong to different categories. This embodiment enables the proposed server system to analyze several data streams adapted for transmission to user's clients that belong to different classifications—e.g. because they reside in different regions of a country—in real-time. This in turn allows the server system to use the results of the analyses to select additional information and transmit the selected additional information to the user's client or another device that belongs to the user.

According to an embodiment of the invention it is proposed that the screenshots are created in regular or irregular intervals, in particular in intervals of one to three seconds, depending on the type of data that are transmitted via the data stream. The inventor has found that creating screenshots in regular intervals of about two seconds results in a suitable tradeoff between detection accuracy on one hand and computing time and storage space on the other hand and is in particular suitable for data streams that represent TV programs.

As mentioned above, some positions within the data stream may be especially important when it comes to the presentation of additional information to the user, for example the presentation of an URL to some background information, an advertisement or an URL to an online shop where a specific product or service can be ordered. According to one embodiment of the invention, wherein the data stream comprises video data that belong to the at least one category and video data that do not belong to the at least one category, a specific position is defined to be a start position whenever the timestamp that was analyzed previously to the timestamp corresponding to the specific position was detected to not belong the at least one category. This means that a start position is the first timestamp where the content of the data stream has changed from a first type or content that is unknown or of no interest, to a second type of content that is detected for the first time in a set of consecutive screenshots. With respect to the present invention, the second type of content is represented by a predefined category. For example, a start position can be used as a marker that indicates the start of a commercial brake within a TV-Program. The detection of a start position can thus trigger the process of transmitting and displaying additional information to the user with minimal time delay to the beginning of the commercial break.

In order to detect whether the screenshot belongs to a predefined category, the screenshot is input to an AI-system that is trained to perform this detection. The term 'predefined category' is to be understood very broad throughout this description unless it is stated otherwise. A predefined category may define a type of content, e.g. an 'advertisement', a 'scene in nature', a 'sports broadcast, 'news', or the like. However, a predefined category may also define a particular content that represents for example a particular product, e.g. a car or a laptop. A predefined category may further define a particular commercial break for advertising a particular product. Moreover, a predefined category may generally or specifically describe parts of a data stream where servers for online advertisements can chose to select and transmit additional information according to a bidding system as described in EP 2 827 604 B1.

An AI-system is a system that uses so called 'artificial intelligence' to perform a specific task or solve a given problem. In particular algorithms realizing a concept that is known as 'deep learning' and that constitutes a sub-field of artificial intelligence are suitable to work on complex data e.g. in order to classify a given input or make various kinds of data driven decisions.

Once the AI-system is properly trained, it is a fast and reliable system for deciding whether a screenshot belongs to a predefined category. According to an advantageous embodiment of the proposed method, the AI-system is based on an artificial neural network also known as neural network. A neural network consists of so called 'neurons', each of which represent a single function with input and output, where the output of a neuron is fed as input to one or more subsequent neurons. This arrangement creates a mesh that in its totality represents a complex function. In order to create the basic neural network and to create the rules that define the learning process, the AI-system is advantageously build using TensorFlow, which is an open-source framework providing a software library of functions that are particularly useful for creating fast and reliable neural networks.

In addition to using an AI-system for detecting whether the screenshot belongs to a predefined category, the quality and reliability of the detections provided by the inventive method is further enhanced by utilizing audio data, in particular an audio fingerprint corresponding with the screenshot and automatically analyzing the audio data for detecting whether it belongs to the predefined category. If both the screenshot and the corresponding audio data belong to the predefined category, the timestamp that is associated with the current screenshot is denoted as defining a specific position. According to this embodiment, a process of audio-based detection and a process of video-based detection are combined which can be viewed as an implicit plausibility check for deciding, whether the timestamp of a given screenshot defines a specific position. The inventive method has the advantage, that knowledge within the audio data and the knowledge within the trained AI-system are combined for determining whether a given position within the data stream belongs to a predefined category.

In order to speed up the audio-based detection, it is suggested to convert the extracted audio data stream into a low resolution and/or mono audio signal before creating the audio data from the audio data stream and analyzing whether the audio data belong to the predefined category. According to a preferred embodiment, an audio fingerprint is created from the audio data stream or the converted audio data. The audio fingerprint is then used for analyzing whether the audio data at a current position belongs to the predefined category. This speeds up the detection process even more. This detection can be performed by comparing any audio fingerprint with preprocessed fingerprints that are already categorized and stored in a database. For defining whether an audio fingerprint corresponds to a screenshot it is suggested to compare the timestamp associated with the audio data and/or fingerprint and the timestamp associated with the screenshot. If both match the audio fingerprint and the screenshot correspond to each other.

According to an advantageous embodiment a likelihood for screenshot to belong to the predefined category is determined and/or a likelihood for the audio data or the audio fingerprint to belong to the predefined category is determined and the timestamp associated with the screenshot is only decided to belong to the predefined category if
  the screenshot belongs to the predefined category and the likelihood determined for the audio fingerprint is above a predefined first threshold; or
  the audio data and/or audio fingerprint belongs to the predefined category and the likelihood determined for the screenshot is above a predefined second threshold; or
  the likelihood determined for the audio fingerprint is above a first threshold and the likelihood determined for the screenshot is above a second threshold.

The first and the second threshold can be chosen e.g. depending on the quality of the AI-system, the type and quality of the data stream, the quality and/or resolution of the audio fingerprints and/or the quality and/or resolution of the screenshots. Generally, the thresholds are chosen in order to improve the overall reliability of the inventive method for detecting specific positions within a data stream.

In order to use an AI-system that is based on a neural network, it has to be trained before it can be used. The quality and the efficiency of the training process depends on the quality of the data that is used to train the AI-system. According to an embodiment of the present invention, training data consist of screenshots that are preprocessed in order to know for each screenshot whether it belongs to a specific predefined category. The following steps can be used for generating training data from a given data stream, e.g. a TV program that is selected as a basis for training the AI-system:
  extracting an audio data stream and an video data stream out of the data stream;
  creating audio fingerprints out of the audio data stream;
  associating each audio fingerprint with a timestamp;
  comparing the audio fingerprints against a database comprising preprocessed audio fingerprints that belong to the predefined category;
  labeling the fingerprints to indicate whether they belong to the predefined category;
  processing the video data stream to create screenshots at positions that correspond with the timestamps of the audio fingerprints;
  labeling screenshots as belonging to the at least one category if the corresponding audio fingerprint is labeled to belong to this predefined category.

Creating the training data according to the above mentioned method has the advantage that it can be performed automatically. Since several steps for generating the training data correspond with steps of the inventive method for optimizing the detection of a specific position within a data stream, they can be applied with little effort. This speeds up the process of implementing the functionality for generating the training data.

The object is also solved by a system as mentioned above, wherein the system comprises:
  means for connecting the receiver that does not match the at least one predefined criterion with a client-server system that matches the at least one predefined criterion;
  means for receiving the data stream by the client-server system and forwarding the data stream to the receiver;
  means for extracting the video data stream and the audio data stream from the data stream;
  means for creating at least one screenshot out of the video data stream and an associated timestamp;
  an AI-system that is trained to detect whether the screenshot belongs to a predefined category;
  means for feeding the screenshot to the AI-system;
  means for determining audio data corresponding with the screenshot and automatically analyzing the audio data for detecting whether it belongs to the predefined category;
  means for deciding that the timestamp that is associated with the current screenshot defines a specific position, if both the screenshot and the corresponding audio data belong to the predefined category.

The system advantageously can carry out the inventive method, e.g. via a computer program that is programmed to execute the inventive method as described herein when it is run on at least one microprocessor of a component of the system.

Other objects, features, and advantages of the present invention will be readily appreciated as the same becomes better understood after reading the subsequent description taken in connection with the accompanying drawing wherein.

Figure 1:
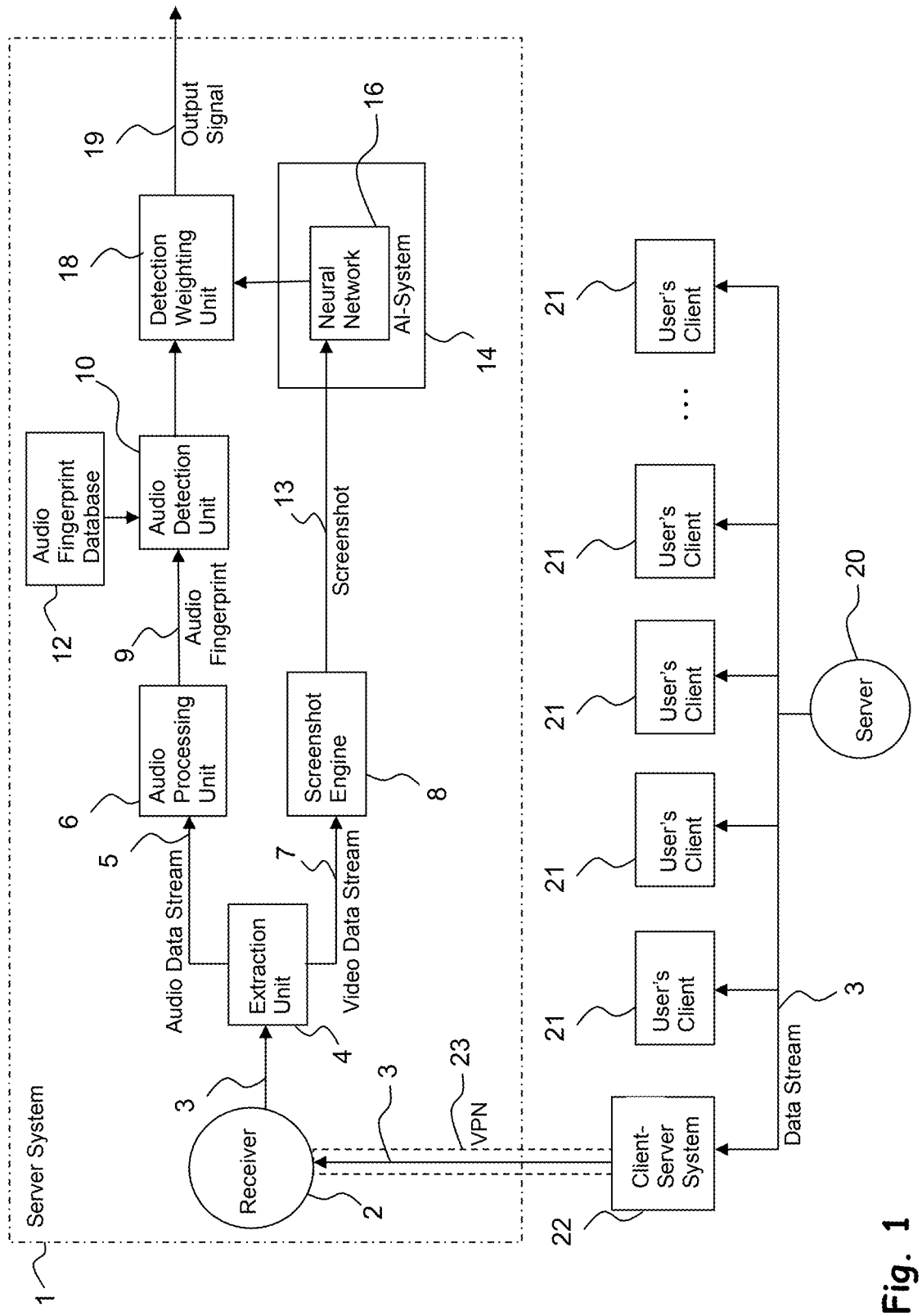
FIG. 1 shows a server system for receiving a data stream and detecting a specific position within the data stream according to an embodiment for carrying out the inventive method.

FIG. 1 shows a server system 1, that is suitable for executing the inventive method. Server system 1 comprises a receiver 2 for receiving a data stream 3, in the present case in the form of a digital TV-signal. Receiver 2 could be realized as an aerial or satellite antenna. Receiver 2 could also be realized as a unit within a server for receiving and transcoding the data stream 3, e.g. a TV program.

The receiver 2 of server system 1 is connected to a client-server system 22 via a Virtual Private Network VPN 23. Client-server system 22 receives the data stream 3 from a server 20 that belongs to a TV station and broadcasts data stream 3 to several user's clients 21. User's clients 21 and client-server system 22 are connected via the internet and an IP address is assigned to each of it. Data Stream 3 comprises regional information that can only be received by a user's client 21 if its IP address defines the user's client as being located in the region data stream 3 is intended to be received in. User's clients 21 that are not located within this specific region are not able to receive the data stream 3. It is assumed that receiver 2 is not located within this region. Client-server system 22 is provides an VPN service and is located in the specific region such that client-server system 22 is able to receive data stream 3 and to forward the data stream via VPN 23 to receiver 2.

The server system 1 also comprises an extraction unit 4 for extracting an audio data stream 5 and a video data stream 7 from the input data stream 3, e.g. the TV program. According to the exemplary embodiment shown in FIG. 1, server system 1 further comprises an audio processing unit 6, an audio detection unit 10 and an audio fingerprint database 12. For processing the video data stream 7 the server system 1 comprises a screenshot engine 8 and an AI (artificial intelligence)-System 14 that comprises a neural network 16. Server system 1 further comprises a detection weighting unit 18. The weighting unit 18 serves for calculating a weighted output signal 19 initially based upon the audio processing and detection in units 6 and 10. The weighting unit 18 calculates the weighted output signal 19 by applying a weighing factor on the output signal of the audio detection unit 10. The weighting factor of weighting unit 18 is updated or corrected depending on the result of the video processing and detection in AI-system 14.

For example, if data stream 3 is a TV program, a specific commercial break (or advertisement) advertising a specific product, the specific product to which the commercial break refers, a specific product which is placed according to product placement in a feature film or a specific decisive moment in a sporting event, may be assigned to a respective audio fingerprint beforehand, i.e. before executing the method of the present invention. The information regarding the specific product or the decisive moment and the respective audio fingerprint are stored in the audio fingerprint database 12 beforehand. In particular, the assignment of the specific product or the decisive moment to the respective audio fingerprint is performed manually by a user. However, this assignment step may also be effected automatically, for instance using time schedules, i.e. containing information when an advertisement for a certain product is to be transmitted on a specific TV-channel (so-called auto-labelling of TV-spots based on time schedules). The time schedules may be obtained from the advertisement provider or the broadcasting company of the TV program.

Figure 2:
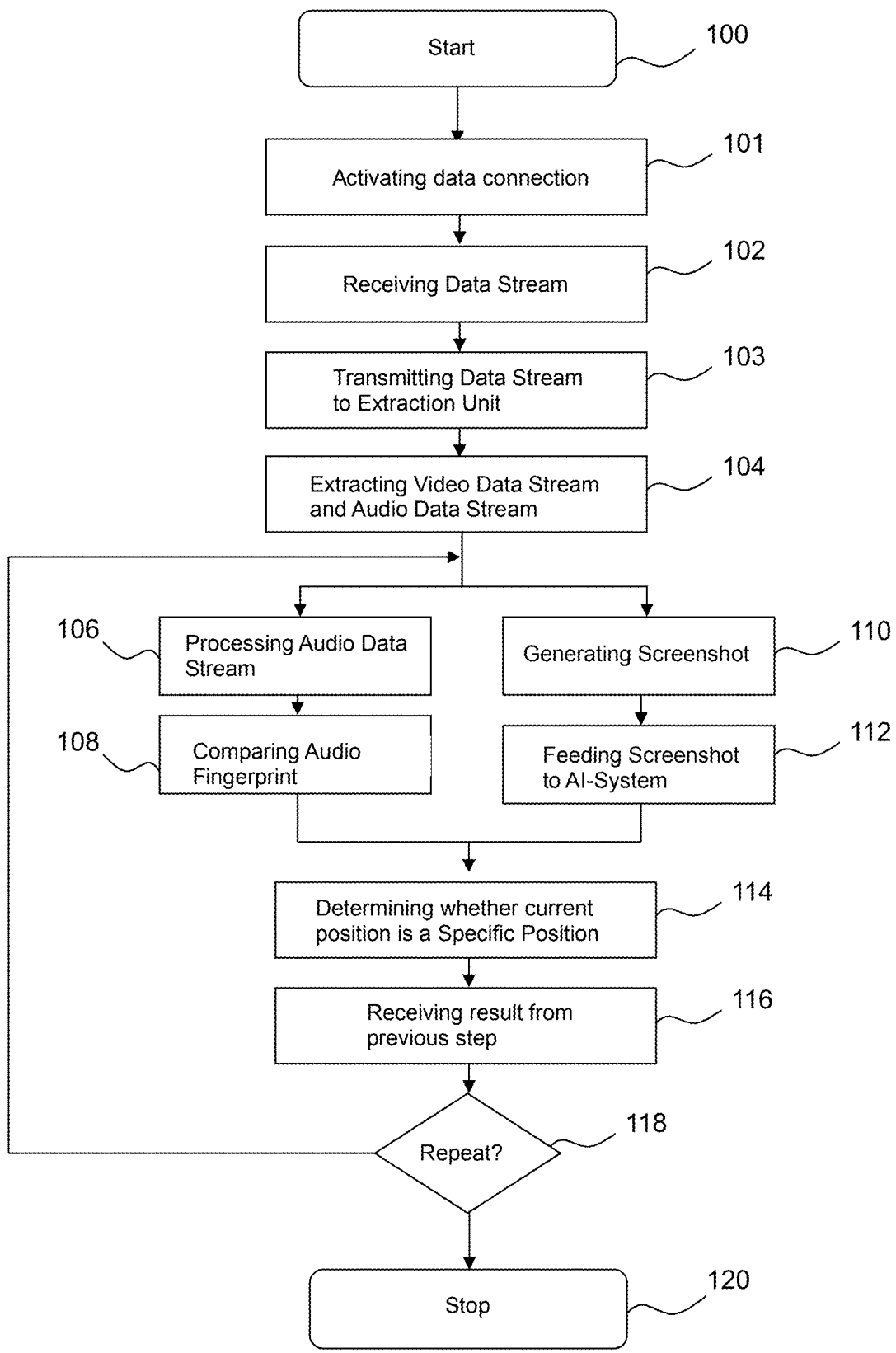
FIG. 2 shows a flowchart of an inventive method according to an embodiment.

FIG. 2 shows a possible embodiment of the inventive method that could be executed on server system 1. The method starts in a step 100. In this step at least one predefined category is selected. As described above, the predefined category might be very specific and refer to a commercial break (i.e. spot or advertisement) advertising a specific product from a specific supplier. The predefined category may also refer to advertisement breaks as such. It might refer to a product placement of a specific product in a feature film or to a specific topic in the underlying data stream e.g. the decisive moments in a sporting event, e.g. in a soccer match.

In a step 101, a data connection between receiver 2 and client-server system 22 is established and/or activated. The data connection is preferably realized as a VPN 23. The client-server system 22 can be any device that is configured to receive data stream 3 from server 20 and to forward the data stream to receiver 2. According to a preferred embodiment of the inventive method, data stream 3 is transmitted from server 20 to client-server system 22 and the user's devices 21 via the internet. The IP addresses of each user's client 21 and the IP address of client-server system 22 can then be used to decide, whether a regionally adapted data stream 3 is transmitted to the specific user's client 21 and the client-server system 22. For example, a data stream 3 that is classified according to at least one criterion, e.g. because it contains regionally adapted content, is only sent to user's client 21, if the IP address of user's client 21 indicates that user's client 21 matches the criterion, e.g. by being located within the specified region. The same holds for client-server system 22: A classified data stream 3 is only sent to client-server system 22, if the IP address of client-server system 22 indicates that the client-server system 22 matches the criterion, e.g. by being located within the specified region. This means that the client-server system 22 is chosen such that it matches with the criterion and is able to receive the specific data stream 3. Client-server system 22 can specifically be implemented to receive and forward data stream 3 to receiver 2. Advantageously, client-server system 22 is an already available system, e.g. a commercial system that allows to use various services from remote or any ordinary user's device 21 that is configured to forward the data stream 3 to receiver 2 and thus turns into a client-server system 22.

Since client-server system 22 is able to receive and forward the classified data stream 3 to receiver 2, receiver 2 can be located elsewhere. Using a VPN 23 allows to have a stable and well-defined data connection between receiver 2 and client-server system 22.

The inventive method enables server system 1 in particular to receive and analyze various classified data streams 3 at the same time, e.g. various regionally adapted data streams 3 without the need to implement a receiver 2 in each region of a country. Thus, server system 1 can select additional information for various regionally adapted data streams 3 and transmit the additional information the specific user's clients 21 or any other devices that are related to a user's device 21 and configured to receive additional information.

In a step 102, at least one data stream 3 is received by receiver 2 and it is checked whether more than one data stream 3 is forwarded to server system 1 in parallel. Receiver 2 can be configured to receive more than one data stream 3 at a time and/or further receivers 2 can be used for receiving several different data streams 3. If more than one or several data streams 3 are received in parallel, the following steps are preferably executed for each individual data stream 3.

In a step 103, data stream 3 is transmitted to extraction unit 4.

In a step 104, data stream 3, e.g. a TV program, is processed by extraction unit 4 in order to isolate and extract the audio data stream 5 and the video data stream 7 from data stream 3. Algorithms for performing this task are known in the art in various forms. Extraction unit 4 can be realized in software, in hardware or by any combination thereof.

In a step 106, the audio data stream 5 is processed by audio processing unit 6 in order to enable and/or improve the automatic detection of specific positions (e.g. the beginning of a specific commercial break (or advertisement) advertising a specific product or a decisive moment of a sports event) within audio data stream 5. This processing may in particular include a normalization of the audio data that could comprise converting a stereo or multichannel audio signal into a mono audio signal and/or converting a high resolution audio signal into a low resolution audio signal. Step 106 is designed to reduce the computing complexity and increase the processing speed in the subsequent steps of detecting the specific position within the audio data stream 5. According to an advantageous embodiment, step 106 also comprises the generation of an audio fingerprint 9.

According to a preferred embodiment, the audio fingerprint 9 is calculated in the following way: The audio part, i.e. audio data stream 5, of an MPEG data stream 3 (in practice MPEG-2 according to ISO/IEC 13818 or MPEG-4 according to ISO/IEC 14496) is merged into mono and then down-sampled from for instance 44 kHz to for instance 11 kHz. Technically, the audio data stream 5 may be in the mp3-format, but other codecs may also be used, e.g. AAC (Advanced Audio Coding). Generally, the level of complication of the audio data steam 5 is overwhelming. Then, using Fast Fourier Transformation, with a frame of e.g. 2.048 samples, a frequency-domain representation of the audio data stream 5 is calculated, with about 6 "snapshots" per second of the signal. From the frequency representation a number of, e.g. 16, 8-bit centroids (an average of the signal's strength in a section of the spectrum) are calculated, which cover the whole available spectrum. So in the end, each FFT-frame of the audio data stream 5 is represented by a vector of 16 numbers (from 0 to 255), and the whole audio fingerprint 9 for a specific advertisement or spot by a matrix of 16×n, where n is how many 2.048-sample FFT frames have been created (about 6 frames per second).

Audio fingerprint 9 is compared in a step 108 against a collection of audio fingerprints that are stored in the audio fingerprint database 12. Each audio fingerprint stored in database 12 is labeled in order to indicate whether it belongs to a predefined category with relevance to the data stream 3 that is currently processed. Therefore, at least some of the fingerprints stored in database 12 are generated and labeled before executing the method of the present invention, as previously mentioned. The comparison step 108 may be executed by the detection unit 10.

Further, for the comparison step 108, according to a preferred embodiment of the invention, the detection unit 10 calculates a distance (e.g. in a 16-dimensional space) between known fingerprints from the audio fingerprint database 12 and current signal (i.e. the previously calculated audio fingerprint 9). When the distance (abruptly) drops to a value close to 0 and remains there for a certain period of time, it is assumed that there is a match between the audio fingerprint 9 and one of the previously stored audio fingerprints from the audio fingerprint database 12.

The comparison in step 108 aims in deciding whether the currently analyzed audio fingerprint 9 belongs to the predefined category that was selected in step 100. According to one possible embodiment of step 108, audio fingerprint 9 is only compared against audio fingerprints stored in database 12 that are known to belong to the predefined category and that are labeled accordingly. Algorithms for comparing audio fingerprints are well known from the art and provided e.g. via several programming languages and/or frameworks that are suitable for performing analysis and conversions of audio data. If a matching audio fingerprint is found in database 12, i.e. an audio fingerprint that on the one hand belongs to the predefined category on the other hand is identical or at least sufficiently similar to audio fingerprint 9, it is decided in audio detection unit 10 that audio fingerprint 9 belongs to the predefined category. According to an advantageously embodiment, an indicator, e.g. a number is determined in order to indicate the likelihood of audio fingerprint 9 to belong to the predefined category. If for example an audio fingerprint is found in database 12 that belongs to the predefined category and is identical to audio fingerprint 9, the likelihood could be defined as being 100 as being the highest likelihood. If on the other hand the only matching fingerprint found in database 12 is only quite similar, the likelihood could be set to 50. According to this example, any number between 0 and 100 might be used to indicate the likelihood of audio fingerprint 9 to belong to the predefined category, based on analyzing the quality of the match of audio fingerprint 9 and the audio fingerprints stored in database 12.

In steps 110 and 112, the video data stream 7 is processed. In step 110 the screenshot 13 is generated in screenshot engine 8 from video stream 7. Screenshot 13 is preferably generated synchronously or approximately synchronously with the generation of audio fingerprint 9 in step 106. Advantageously, screenshots 13 are generated at certain time intervals, e.g. regularly every 2 seconds. According to a preferred embodiment of the present invention, screenshots 13 are stored in an image file together with a timestamp indicating the time-based position of the respective screenshot 13 within data stream 3.

In a step 112, screenshot 13 is input to the AI-system 14. According to an embodiment of the invention, AI-system 14 is trained to decide whether screenshot 13 belongs to the category previously defined or selected in step 100. According to another embodiment, AI-system 14 determines a likelihood that screenshot 13 belongs to the predefined category. The likelihood might be described in values ranging from 0 to 10 or from 0 to 100 or in values from any number or symbol that is defined as a minimum likelihood to any number or symbol that is defined as a maximum likelihood.

Both the result of step 108 (information indicative of whether audio fingerprint 9 belongs to the predefined category and/or the likelihood thereof) and the result of step 112 (information indicative of whether screenshot 13 belongs to the predefined category and/or the likelihood thereof) are further processed in a step 114 in order to determine whether the current position within data stream 3 that corresponds with the timestamp of screenshot 13 (from now on also referred to as 'current position') is a specific position.

According to one possible implementation of step 114, where the result of step 108 is a decision of whether the audio fingerprint 9 belongs to the predefined category and where the result of step 112 is a decision of whether the screenshot 13 belongs to the predefined category, the current position is determined to be a specific position only if both, audio fingerprint 9 and the corresponding screenshot 13 belong to the predefined category.

According to another possible implementation of step 114, where the result of step 108 is the likelihood that audio fingerprint 9 belongs to the predefined category and where the result of step 112 is the likelihood that the corresponding screenshot 13 belongs to the predefined category, the current position is determined to be a specific position if the likelihood that audio fingerprint 9 belongs to the predefined category exceeds a predefined first threshold and the likelihood that screenshot 13 belongs to the predefined category exceeds a predefined second threshold. The first threshold might be a value representing a likelihood of e.g. 80% and the second threshold might be a value representing a likelihood of e.g. 90%. However, these are just examples of possible thresholds in order to understand the basic principle and other values may of course be used, too.

Typically, the first threshold is chosen with respect to the quality of the step 108, which in turn depends on the data available in database 12 and the process of normalization performed in step 106. If for example the process of detecting whether audio fingerprint 9 belongs to the predefined category is very reliable which means that an erroneous result is highly unlikely, then the first threshold might be set to a high value, e.g. 95% or any other value that seems to be suitable. Likewise, the second threshold is chosen with respect to the quality of the AI-system 14, which in turn depends on the design and the training of neural network 16. If for example the process of detecting whether screenshot 13 belongs to the predefined category is very reliable which means that an erroneous result is highly unlikely, then the second threshold might be set to a high value, e.g. 90% or any other value that seems to be suitable. Of course any thresholds can be chosen e.g. depending on the quality of the AI-system 14, the quality of database 12, the type and quality of data stream 3 and the implementation of any component of server system 1. Generally, the thresholds are chosen in order to improve the overall reliability of the inventive method for detecting specific positions within a data stream.

Various different procedures are possible and known for making a decision based on two likelihoods. For example, step 114 could be realized such that the current position is determined to be a specific position only if the sum or any numerical combination of both likelihoods exceeds a given threshold.

In a step 116, the result of step 114 is made available for further processing. For example, if data stream 3 is a TV program and the predefined category describes a specific commercial break advertising a specific product, the information received in step 116 could be used to start a process comprising a step of selecting additional information e.g. an URL to an online-shop where the product can be ordered and a step of transmitting this URL to a client device of the user who is currently receiving the data stream 3, i.e. watching the TV program.

Steps 106 to 116 may be repeated until in a step 118 it is decided to stop executing the inventive method in a step 120, e.g. because data stream 3 has come to an end or because the selection and transmission of additional information to the user's client device is paused or no longer desired.

Figure 3:
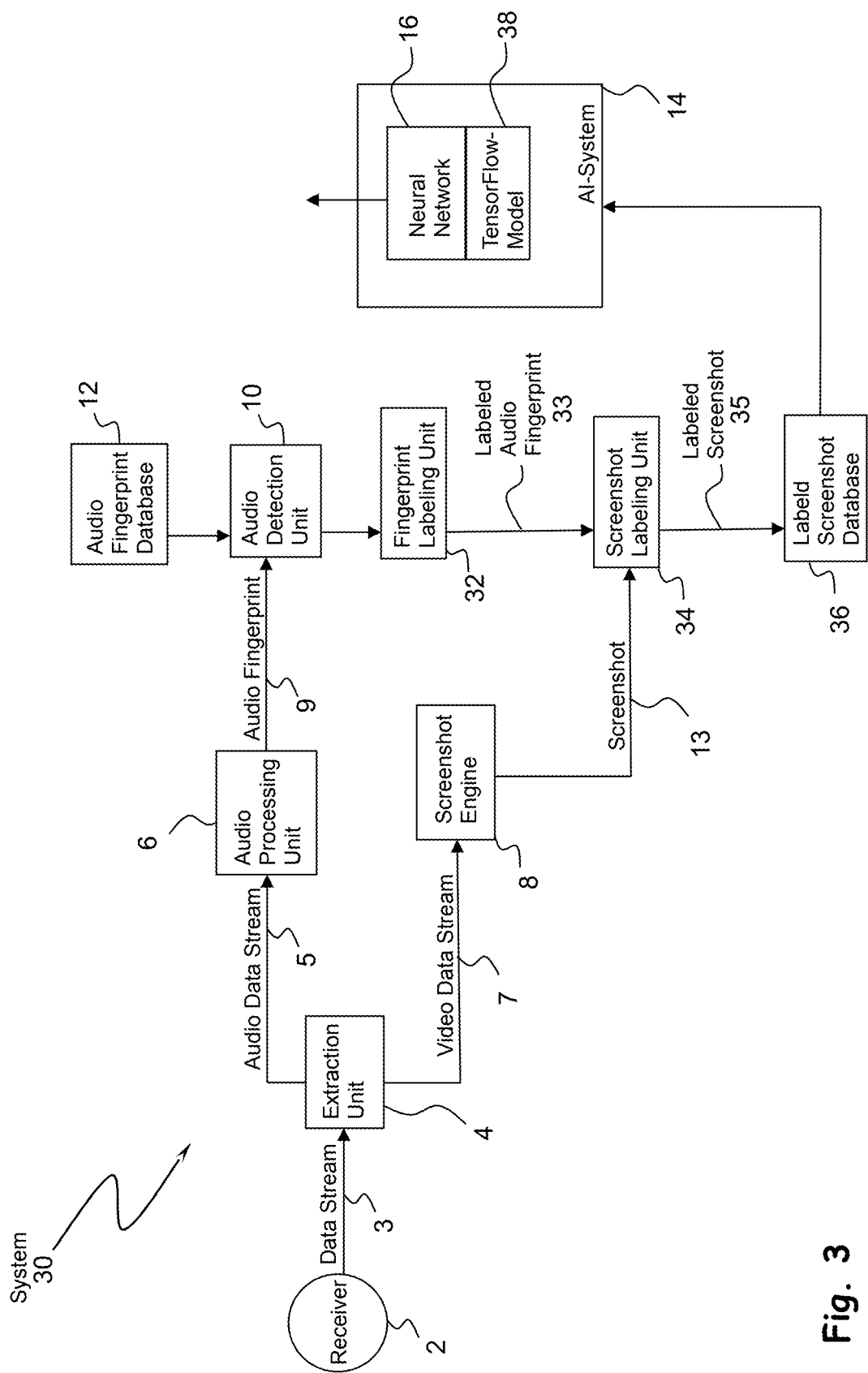
FIG. 3 shows components that are suitable for training an AI-system that is part of a system for optimizing the detection of a specific position within a data stream according to a possible embodiment.

FIG. 3 shows a system 30, that is suitable for training an AI-system 14. Components of system 30 that may also be used in server system 1 for optimizing the detection of a specific position within a data stream 3 as shown in FIG. 1 have been labeled with the same reference numbers.

System 30 comprises a receiver 2 for receiving a data stream 3. Receiver 2 could be realized as an aerial or satellite antenna. Receiver 2 could also be realized as a unit within a server for receiving and transcoding a data stream 3, e.g. a TV program. System 30 further comprises an extraction unit 4 for extracting an audio data stream 5 and a video data stream 7 from data stream 3. According to the exemplary embodiment shown in FIG. 3, system 30 comprises an audio processing unit 6, an audio detection unit 10 and an audio fingerprint database 12. For processing the video data stream 7, system 30 comprises a screenshot engine 8. System 30 further comprises an audio fingerprint labeling unit 32, a screenshot labeling unit 34, a labeled screenshot database 36 and an AI-system 14 comprising a neural network 16 and a TensorFlow model 38 that defines the neural network 16.

Figure 4:
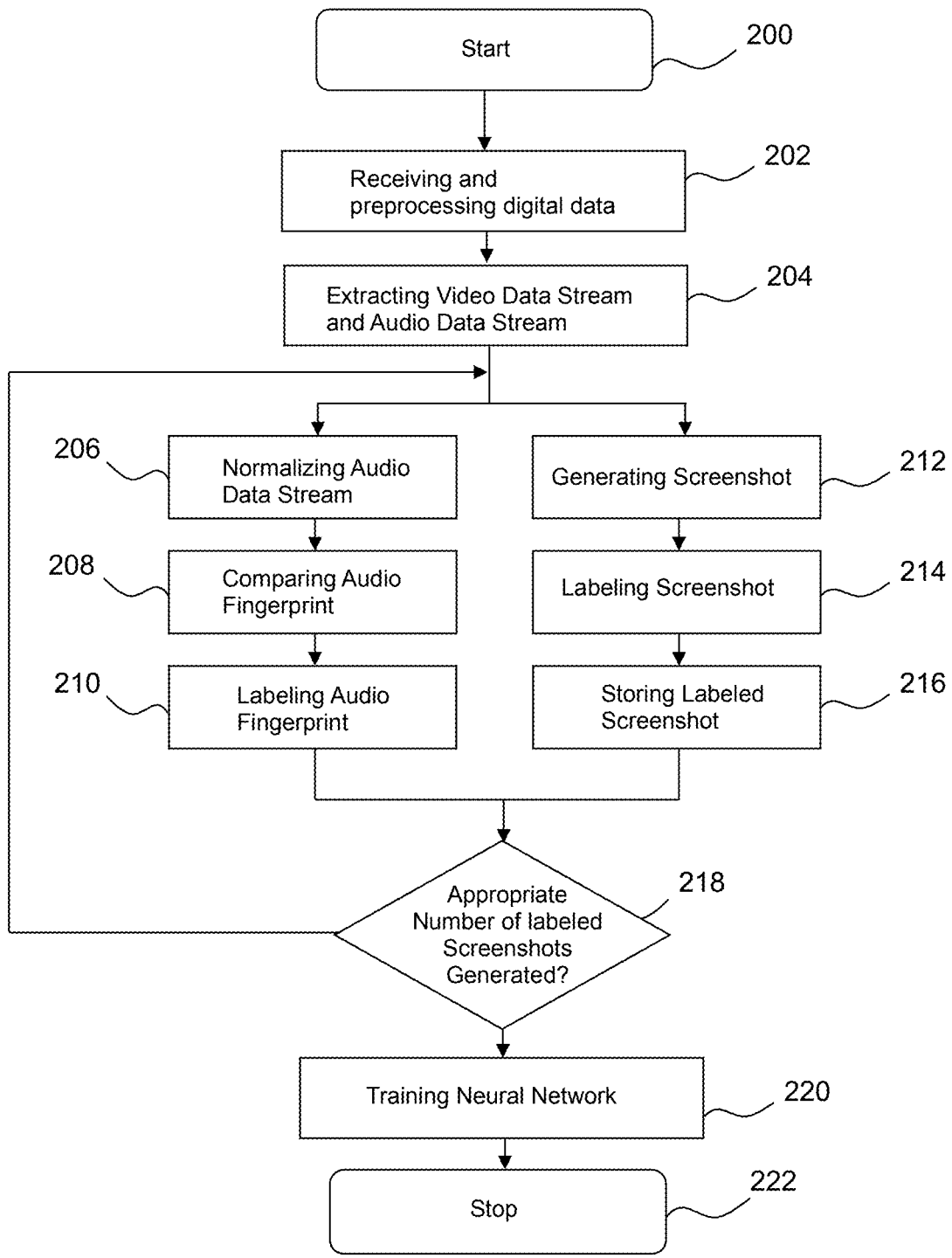
FIG. 4 shows a flowchart comprising steps for training the AI-system according to a possible embodiment.

FIG. 4 shows a possible embodiment of a method for training an AI-system 14. The method starts in a step 200. In this step, at least one predefined category is selected. In a step 202, digital data are received with receiver 2 and preprocessed such that a data stream 3 is reassembled. Data stream 3 is forwarded to extraction unit 4, and in a step 204, an audio data stream 5 and a video data stream 7 are extracted from data stream 3.

In a step 206, audio data stream 5 is normalized by audio processing unit 6 such that the stereo or multichannel audio signal of audio data stream 5 is transformed into a mono audio signal and/or the resolution of the audio signal is reduced. According to an advantageous embodiment, step 206 also comprises the generation of an audio fingerprint 9.

In a step 208, audio fingerprint 9 is compared by audio detection unit 10 with a collection of audio fingerprints that are stored in audio fingerprint database 12. The audio fingerprints stored in audio fingerprint database 12 are labeled in order to indicate whether they belong to the predefined category. The comparison in step 208 aims at deciding whether the currently analyzed audio fingerprint 9 belongs to the predefined category that was selected in step 200. Audio fingerprint 9 is then forwarded together with information that shows the result of the comparison to audio fingerprint labeling unit 32. In a step 210 audio fingerprint 9 is labeled in order to indicate whether it belongs to the predefined category. The labeled audio fingerprint 33 is forwarded to screenshot labeling unit 34.

In a step 212, a screenshot 13 is generated from video stream 7. Preferably, screenshot 13 is generated synchronously or approximately synchronously with the generation of audio fingerprint 9 in step 206. According to a preferred embodiment of the present invention, screenshot 13 is stored in an image file together with the timestamp indicating the time-based position of the screenshot 13 within data stream 3 and then forwarded to screenshot labeling unit 34.

In a step 214, screenshot 13 is labeled in accordance with the corresponding labeled audio fingerprint 33 resulting in a labeled screenshot 35. The label of labeled screenshot 35 indicates whether the corresponding labeled audio fingerprint 33 belongs to the predefined category. Since audio fingerprint 9 and screenshot 13 are generated synchronously they both refer to the same position within data stream 3. This in turn means that the label of labeled screenshot 13 (as well as the label of the corresponding audio fingerprint 9) further indicates that the position within data stream 3 that corresponds to the current timestamp of the labeled screenshot 35 (and the timestamp of the labeled audio fingerprint 33) is a specific position, for example the beginning of a commercial break. In a step 216 the labeled screenshot 35 is stored in labeled screenshot database 36.

Typically, steps 206 to 216 are repeated several times in order to generate a certain amount of training data i.e. labeled screenshots 35. The number of labeled screenshots 35 needed for sufficiently training AI-system 14 depends on various parameters, e.g. the design of the neural network 16, the resolution of the screenshots 7 and/or the desired quality of the detections to be performed by the trained AI-system 14.

In a step 218, it is verified, whether the appropriate number of labeled screenshots 35 has been generated. If this is the case, the neural network 16 is trained in a step 220 utilizing the labeled screenshots 35 that are stored in labeled screenshot database 36. Since it is now known whether the labeled screenshots 35 correspond to a specific position or not, AI-system 14 can be taught to make correct detections. According to an embodiment of the inventive method, the training process itself is part of the implementation of AI-system 14 and may in particular be defined using the TensorFlow model 38. The training in step 220 may be based on screenshots 7 of several different data streams 3 as input for further improving the detection quality of the trained AI-system 14 when used to detect specific positions within data streams 3 as described in relation to FIG. 2. If the AI-system 14 has been successfully trained, the process may stop in a step 222.

Preferably, if the data stream 3 is a TV program, during the training process of the AI-system 14, for each spot or advertisement in the data stream 3, a plurality of audio fingerprints 9 are created in the audio processing unit 6 and a corresponding plurality of screenshots 13 are created in the screenshot engine 8. The plurality of audio fingerprints 9 and screenshots 13 provide for a higher reliability of a correct training process of the AI-system 14. Thus, an average of three or more detections of the spot or advertisement (possibly on different TV-channels) are used to train the neural network 16, thereby eliminating any occasional false detections.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

The invention claimed is:

1. A method for receiving a data stream by a receiver and detecting at least one specific position within the data stream, wherein
    the data stream comprises at least one video data stream and at least one audio data stream;
    the data stream is classified according to at least one predefined criterion; and
    the data stream is intended to be received by user's clients that match the at least one predefined criterion, characterized in that the method comprises the following steps:
        connecting the receiver that does not match the at least one predefined criterion with a client-server system that matches the at least one predefined criterion;
        receiving the data stream by the client-server system and forwarding the data stream to the receiver;
        extracting the at least one video data stream and the at least one audio data stream from the data stream;
        creating at least one screenshot out of the at least one video data stream and an associated timestamp;
        feeding the at least one screenshot to an Artificial Intelligence (AI) system, including where the AI-system is based on a neural network (16), that is trained to detect whether the at least one screenshot belongs to a predefined category;
        generating audio data corresponding with the at least one screenshot and automatically analyzing the audio data for detecting whether it belongs to the predefined category;
        if both the at least one screenshot and the audio data generated and analyzed belong to the predefined category, then deciding that the associated timestamp for the at least one screenshot defines a specific position.

2. The method of claim 1, characterized in that the data stream is a television signal and transmitted via cable, satellite, internet, or a combination thereof.

3. The method of claim 1, characterized in that the user's clients comprise a Hybrid Broadcast Broadband television device.

4. The method of claim 1, characterized in that the user's clients are classified according to a federal state, a province, a region, or a combination thereof.

5. The method of claim 1, wherein an Internet Protocol (IP) address is assigned to each of the user's clients of the client-server system, and IP addresses are used for classification, characterized in that the receiver is connected to the client-server system via a Virtual Private Network.

6. The method of claim 1, characterized in that the receiver is connected to more than one client-server system and receives more than one data stream, the more than one data streams being classified differently.

7. The method of claim 1, characterized in that the predefined category defines a type of content, including advertisements, a specific content, including a specific advertisement or both the type of content and the specific content, of the data stream.

8. The method of claim 1, wherein the data stream comprises first video data that belong to at least one predefined category and second video data that do not belong to the at least one predefined category, characterized in that the specific position is defined to be a start position whenever the associated timestamp that was analyzed previously to a subsequent timestamp corresponding to a subsequent specific position subsequently detected to not belong to the at least one predefined category.

9. The method of claim 1, wherein the data stream is transmitted to a first client for being viewed by a user, characterized in that additional information is transmitted to the first client or a second client of the user if the associated timestamp defines the specific position.

10. The method of claim 1, characterized in that a likelihood for the at least one screenshot to belong to the predefined category is determined, or a corresponding likelihood for the audio data or an audio fingerprint (9) to belong to the predefined category is determined and the associated timestamp for the at least one screenshot is only decided to belong to the predefined category, or a combination thereof, if
    the at least one screenshot belongs to the predefined category and the corresponding likelihood determined for the audio fingerprint is above a predefined first threshold; or the audio data and/or audio fingerprint belongs to the predefined category and the likelihood determined for at least one screenshot is above a predefined second threshold; or the corresponding likelihood determined for the audio fingerprint is above a first threshold and the likelihood determined for the at least one screenshot is above a second threshold.

11. The method of claim 10, characterized in that the likelihood for the at least one screenshot to belong to the predefined category is determined by the AI-system.

12. The method of claim 1, characterized in that the at least one audio data stream is converted into a converted-audio data stream having a low resolution signal, a mono audio signal, or a low resolution signal and mono audio signal; and the converted audio data stream is used for determining whether the audio data at a current position belong to the predefined category.

13. The method of claim 1, characterized in that an audio fingerprint is created from the at least one audio data stream or the audio data converted; and the audio fingerprint is analyzed for determining whether the audio data belongs to the predefined category.

14. The method of claim 1, characterized in that an audio data signal, an audio fingerprint, or the audio data signal and the audio fingerprint, corresponds with at least one screenshot if the associated timestamp for the audio data signal, or the audio fingerprint, or both, matches the associated timestamp of the at least one screenshot.

15. Server system for receiving a data stream by a receiver and for detecting at least one specific position within a data stream, wherein the data stream comprises at least one video data stream and at least one audio data stream, and the data stream is classified according to at least one predefined criterion and intended to be received by user's clients that match the at least one predefined criterion, characterized in that the server system comprises:

means for connecting the receiver that does not match the at least one predefined criterion with a client-server system that matches the at least one predefined criterion;

means for receiving the data stream by the client-server system and forwarding the data stream to the receiver;

means for extracting the at least one video data stream and the at least one audio data stream from the data stream;

means for creating at least one screenshot from the at least one video data stream and an associated timestamp;

an Artificial Intelligence (AI) system, including where the AI-system is based on a neural network, that is trained to detect whether the at least one screenshot belongs to a predefined category;

means for automatically analyzing audio data corresponding with the at least one screenshot for detecting whether it belongs to the predefined category;

means for deciding that a current timestamp that is associated with a current screenshot defines a specific position, if both the at least one screenshot and the audio data analyzed belong to the predefined category.

16. The method of claim 2, characterized in that the user's clients comprise a Hybrid Broadcast Broadband television device.

17. The method of claim 2, characterized in that the user's clients are classified according to a federal state, a province, a region, or a combination thereof.

18. The method of claim 2, wherein an Internet Protocol (IP) address is assigned to each of the user's clients of the client-server system, and IP addresses are used for classification, characterized in that the receiver is connected to the client-server system via a Virtual Private Network.

19. The method of claim 2, characterized in that the receiver is connected to more than one client-server system and receives more than one data stream, the more than one data streams being classified differently.

20. The method of claim 2, characterized in that the predefined category defines a type of content, including advertisements, or a specific content, including a specific advertisement, or both the type of content and the specific content, of the data stream.

* * * * *